(12) United States Patent
Miyahara (10) Patent No.: US 6,988,579 B2
(45) Date of Patent: Jan. 24, 2006

(54) POWER UNIT MOUNT STRUCTURE FOR VEHICLES

(75) Inventor: Tetsuya Miyahara, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 293 days.

(21) Appl. No.: 10/655,116

(22) Filed: Sep. 4, 2003

(65) Prior Publication Data

US 2004/0046296 A1 Mar. 11, 2004

(30) Foreign Application Priority Data

Sep. 6, 2002 (JP) .............................. 2002-262135

(51) Int. Cl.
*F16F 9/00* (2006.01)
*F16F 15/00* (2006.01)

(52) U.S. Cl. ...................... 180/299; 180/300; 248/647; 248/664

(58) Field of Classification Search ................ 180/291, 180/295, 300, 312, 902; 248/637, 638, 646, 248/647, 658, 664, 668; 267/140.11, 140.13
See application file for complete search history.

(56) References Cited

U.S. PATENT DOCUMENTS

| 5,460,238 A | * | 10/1995 | Burke et al. ................ 180/299 |
| 5,947,226 A | * | 9/1999 | Bellamy et al. ............ 180/299 |
| 6,062,550 A | * | 5/2000 | Aoki ...................... 267/140.13 |
| 6,374,939 B1 | * | 4/2002 | Hohnstadt et al. .......... 180/299 |
| 6,386,309 B1 | * | 5/2002 | Park ........................... 180/300 |
| 6,543,756 B2 | * | 4/2003 | Ihara et al. ............. 267/140.13 |
| 6,877,710 B2 | * | 4/2005 | Miyahara et al. ........... 248/637 |

FOREIGN PATENT DOCUMENTS

JP 05126187 A 5/1993

\* cited by examiner

*Primary Examiner*—Christopher P. Ellis
*Assistant Examiner*—Brian Swenson
(74) *Attorney, Agent, or Firm*—Rankin, Hill, Porter & Clark LLP (57) ABSTRACT

A vehicular power unit mount structure having a first mounting member for attachment to a power unit and a second mounting member elastically connected to the first mounting member for attachment to a vehicle body. The mount structure includes an elastic waterproofing cover having an axial displacement stopper and a radial displacement stopper. The axial displacement stopper is engageable with an end of a tubular portion of the second mounting member to elastically absorb impact shock and eventually stop movement of a shaft portion of the first mounting member when the shaft portion is displaced in an axial direction toward the second mounting member. The radial displacement stopper is engageable with an inner cylindrical surface of the tubular portion to elastically absorb impact shock and eventually stop movement of the shaft portion when the shaft portion is displaced in a radial direction relative to the second mounting member.

3 Claims, 6 Drawing Sheets

POWER UNIT MOUNT STRUCTURE FOR VEHICLES

FIELD OF THE INVENTION

The present invention relates to a vehicular power unit mount structure having stoppers that restrict relative displacement in two mutually perpendicular directions between two elastically connected mounting members attached to a power unit and a vehicle body, respectively.

BACKGROUND OF THE INVENTION

Vehicular power unit mount structures having displacement stoppers provided at different positions are known as disclosed, for example, in Japanese Patent Laid-open Publication No. HEI 5-126187.

Figure 6:
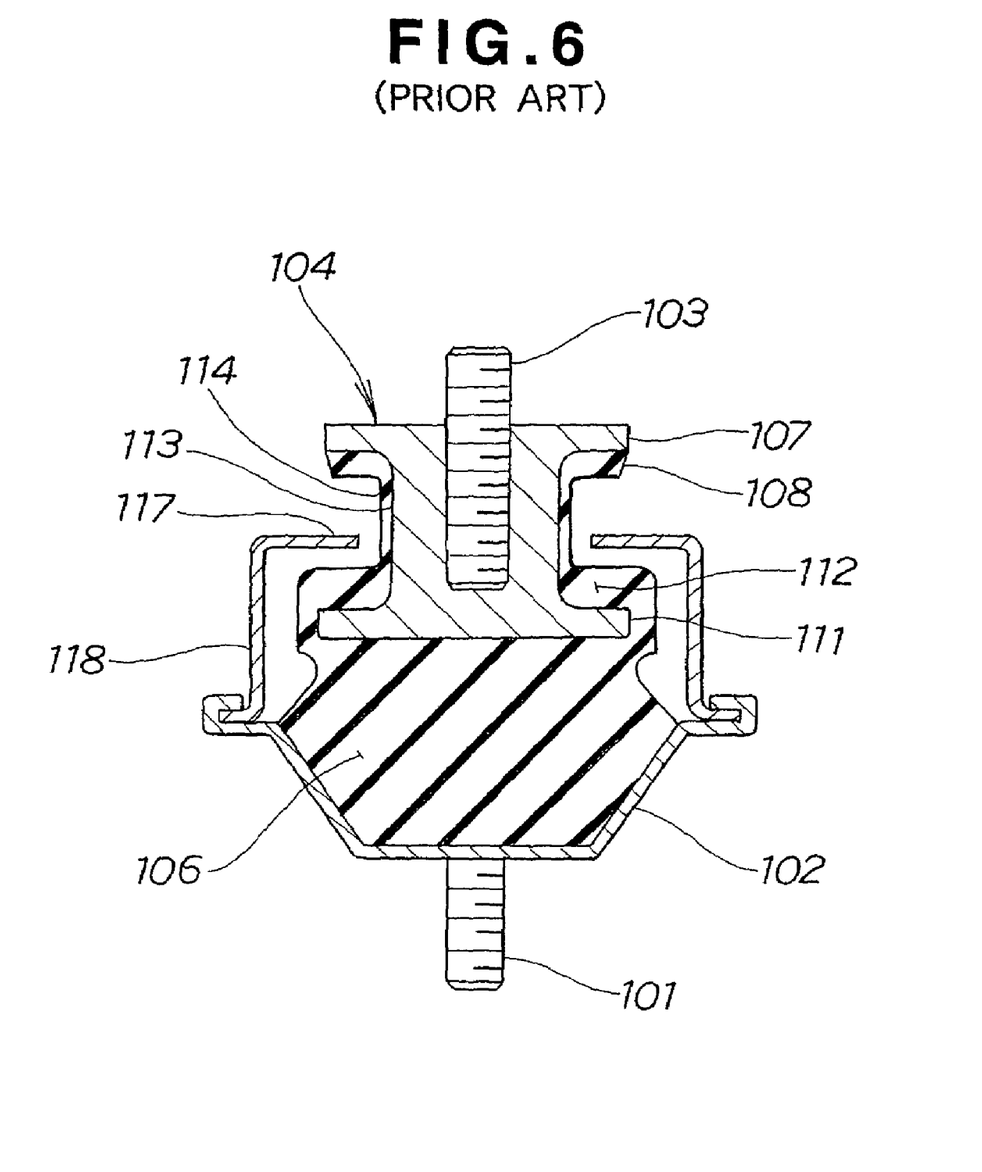
FIG. 6 is a sectional view showing a conventional power unit mount structure.

The disclosed power unit mount structure, as illustrated here in FIG. 6, comprises a lower case member 102 having a lower attachment bolt 101, a flanged cylindrical member 104 having an upper attachment bolt 103, and a rubber member 106 chemically bonded to the lower case member 102 and the flange member 104 to elastically connecting them together. The flanged cylindrical member 104 is embedded in the rubber member 106 such that the rubber member 106 includes an upper abutment portion 108 formed on a lower surface of an upper annular flange 107 of the cylindrical member 104, a lower abutment portion 112 formed on an upper surface of a lower annular flange 111 of the cylindrical member 104, and a circumferential abutment portion 114 formed on a cylindrical surface of a body 113 of the cylindrical member 104 disposed between the upper and lower abutment portions 108 and 112. An upper case member 118 is clinched at a lower end to the lower case member 102 and narrowed at an upper end so as to form a ring-like stopper portion 117 received in an annular space defined between the upper and lower abutment portions 108, 112 and the circumferential abutment portion 114 of the rubber member 106.

With this arrangement, when the flanged cylindrical member 104 is displaced in a vertical direction relative to the case members 102, 118, the upper abutment member 108 or the lower abutment member 112 may abut on the stopper portion 117 to thereby stop or restrict the vertical displacement of the flanged cylindrical member 104. Alternatively, when the flanged cylindrical member 104 is displaced in a horizontal direction relative to the case members 102, 118, the circumferential abutment portion 114 may abut on the stopper portion 117 so that further horizontal movement of the cylindrical member 104 does not occur.

The known power unit mount structure shown in FIG. 6 is disadvantageous in that due to a complicated configuration of the flanged cylindrical member 104, chemical bonding of the rubber member 106 relative to the flanged cylindrical member 104 is uneasy to achieve. Performance characteristics of abutment portions (displacement stoppers) 108, 112 and 114 depend largely on the amount of displacement of the flanged cylindrical member 104 and the hardness of the rubber member 106. To change the performance characteristics of the displacement stoppers 108, 112, 114, the shape and the material of the rubber member 106 need to be changed. However, such change is uneasy to achieve because the displacement stoppers 108, 112, 114 are chemically bonded as parts of the rubber member 106 to the flanged cylindrical member 104.

It is accordingly an object of the present invention to provide a vehicular power unit mount structure having displacement stoppers which are easy to manufacture and also easy to change performance characteristics of the displacement stoppers.

SUMMARY OF THE INVENTION

According to the present invention, there is provided a power unit mount structure for a vehicle, comprising a first mounting member for attachment to a power unit and having a shaft portion, a second mounting member for attachment to a vehicle body and having a tubular portion surrounding the shaft portion with an annular space defined therebetween, an elastic connecting member elastically connecting the first and second mounting members, and an elastic waterproofing cover that covers the annular space between the shaft portion and the tubular portion. The elastic waterproofing cover is made of elastic material and has an axial displacement stopper engageable with an end of the tubular portion of the second mounting member to elastically absorb impact shock and eventually stop movement of the shaft portion when the shaft portion is displaced in an axial direction toward the second mounting member, and a radial displacement stopper engageable with an inner cylindrical surface of the tubular portion of the second mounting member to elastically absorb impact shock and eventually stop movement of the shaft portion when the shaft portion is displaced in a radial direction perpendicular to the axial direction relative to the second mounting member.

The radial and axial displacement stoppers formed as integral parts of the elastic waterproofing cover can be easily produced at a relatively low cost. Furthermore, use of the elastic cover having such displacement stoppers allows the first mounting member to have an extremely simple shape and configuration such as a shaft, as compared to the flanged cylindrical member 104 of the conventional vehicular power unit mount structure shown in FIG. 6. Additionally, performance characteristics of the axial and radial displacement stoppers, which depend largely on the elasticity of the displacement stoppers, can be readily changed merely by changing the shape and material of the elastic cover.

Preferably, the elastic waterproofing cover has a cylindrical sleeve fitted with the shaft portion of the first mounting member and an annular land concentric with the sleeve and projecting toward the end of the tubular portion of the second mounting member, the sleeve and the annular land forming the radial displacement stopper and the axial displacement stopper, respectively.

The second mounting member may further include a guide ling fitted around the tubular portion and having a surface lying flush with the end of the tubular portion for controlling elastic deformation of the annular land such that a portion of the elastic cover including the annular land elastically deforms into a flattened shaped when the portion of the elastic cover is compressed by and between a portion of the power unit and the end of the tubular portion.

BRIEF DESCRIPTION OF THE DRAWINGS

A preferred structural embodiment of the present invention will be described in detail herein below, by way of example only, with the reference to the accompanying drawings, in which.

DETAILED DESCRIPTION OF THE PREFERRED EMBODIMENT

Figure 1:
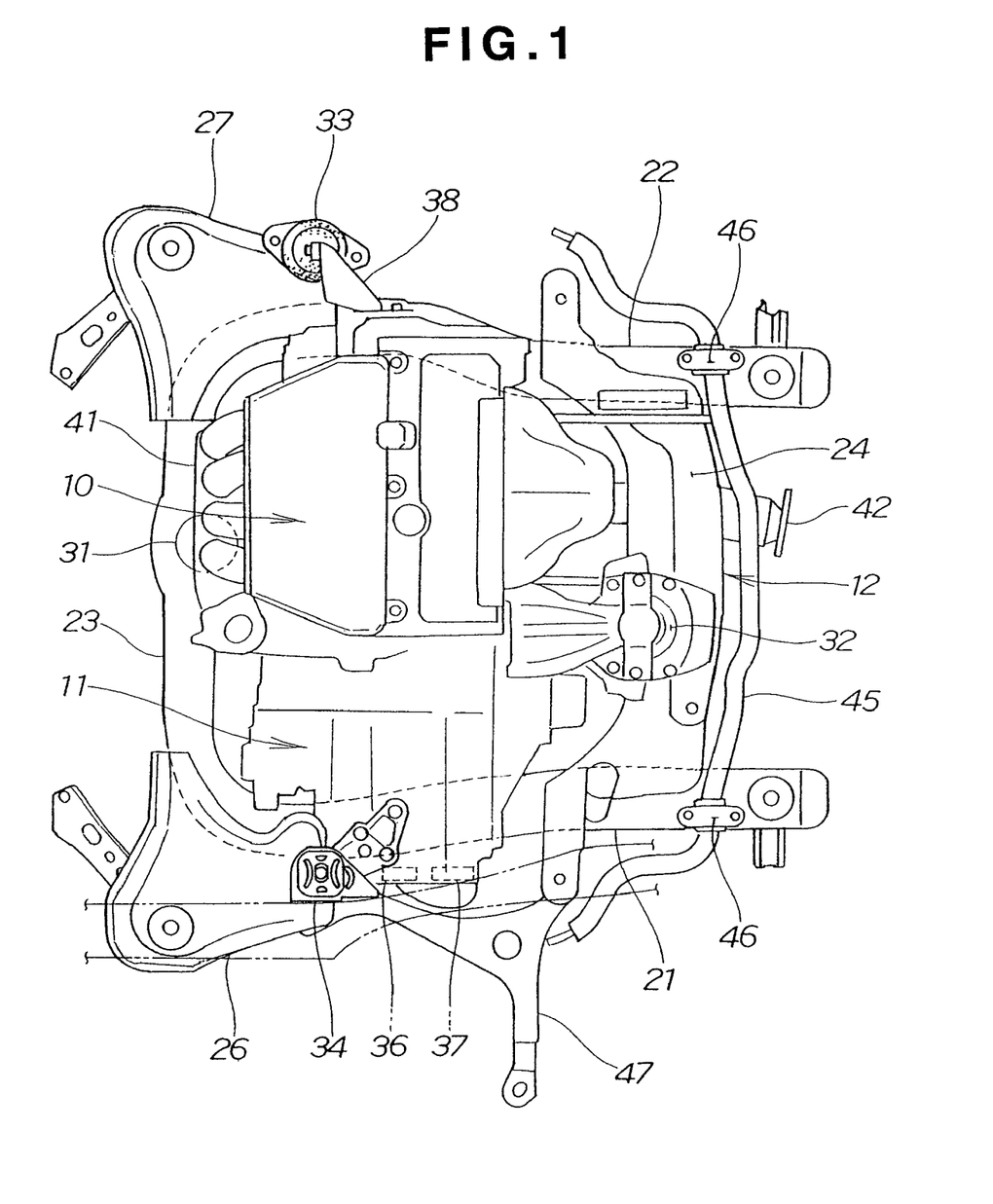
FIG. 1 is a plan view showing the interior of an engine room in which a vehicular power unit is installed using a power unit mount structure according to the present invention.

Referring now to the drawings and FIG. 1 in particular, there is shown in plan view the interior of a vehicular engine room in which a power unit is installed using a power unit mounting structure according to the present invention. The power unit of the vehicle is comprised of a transverse-mounted engine 10. A transmission 11 is assembled integrally with an output end of the engine 10. The engine 10 and transmission 11 thus assembled are supported by a sub-frame 12 and non-illustrated right and left front side frames.

The sub-frame 12 is an assembly formed jointly by left and right longitudinal sub-frame members 21 and 22 extending in a longitudinal or front-to-rear direction of the vehicle, front and rear crossbeams 23 and 24 connecting the longitudinal sub-frame members 21, 22 at their front ends and rear ends, respectively, a left plate 26 attached to a joint portion between the left longitudinal sub-frame member 21 and the front crossbeam 23, and a right plate 27 attached to a joint portion between the right longitudinal sub-frame member 22 and the front crossbeam 23. The sub-frame 12 as a whole is mounted on the front side frames, not shown.

To support a power unit assembly composed of the engine 10 and the transmission 11 a plurality of mounts are used. These mounts include a front mount 31 disposed below a substantially central portion of a front part of the power unit assembly, a rear mount 32 disposed below a substantially central portion of a rear part of the power unit assembly, an engine side mount 33 disposed on a side of the engine 10, a transmission upper mount 34 disposed above an end portion of the transmission 11 which is farthest from the engine 10, and transmission lower mounts 36, 37 disposed below the farthest end portion of the transmission 11. The engine side mount 33 constitutes the power unit mount structure according to the present invention. The engine side mount 33 is attached to the engine 10 via a mount bracket 38, on one hand, and attached to the right plate 27 directly, on the other. The right plate 27 forms part of a vehicle body.

Reference numeral 41 shown in FIG. 1 denotes an intake manifold of the engine 10. Similarly, numeral 42 denotes an exhaust pipe connected to an exhaust manifold, (not shown) of the engine 10. Numeral 45 denotes a stabilizer, numeral 46 denotes brackets used for attaching the stabilizer 45 to the longitudinal sub-frame members 21, 22, and numeral 47 denotes a suspension arm.

Figure 2:
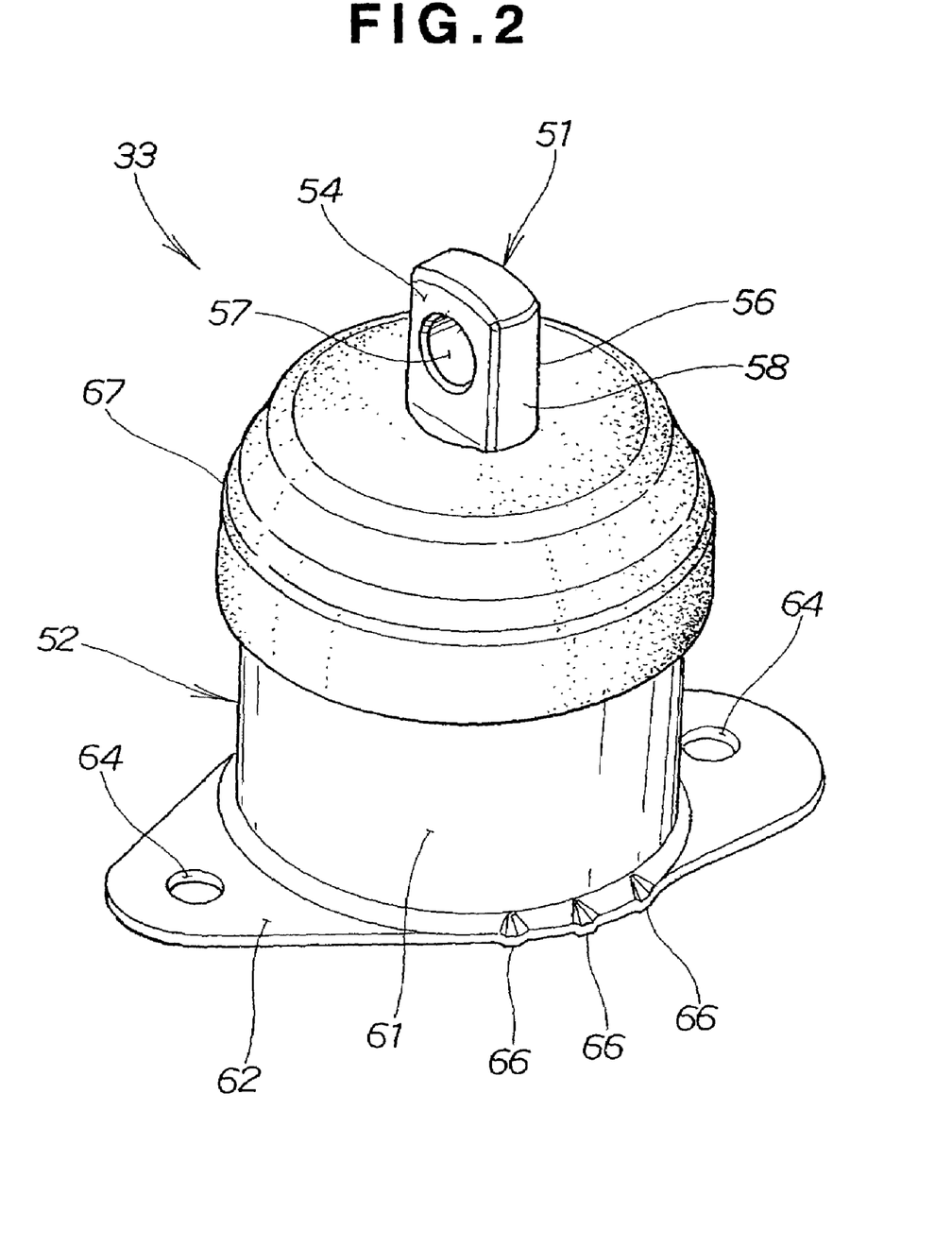
FIG. 2 is a perspective view of an engine side mount constituting part of the power unit mount structure of the present invention.
Figure 3:
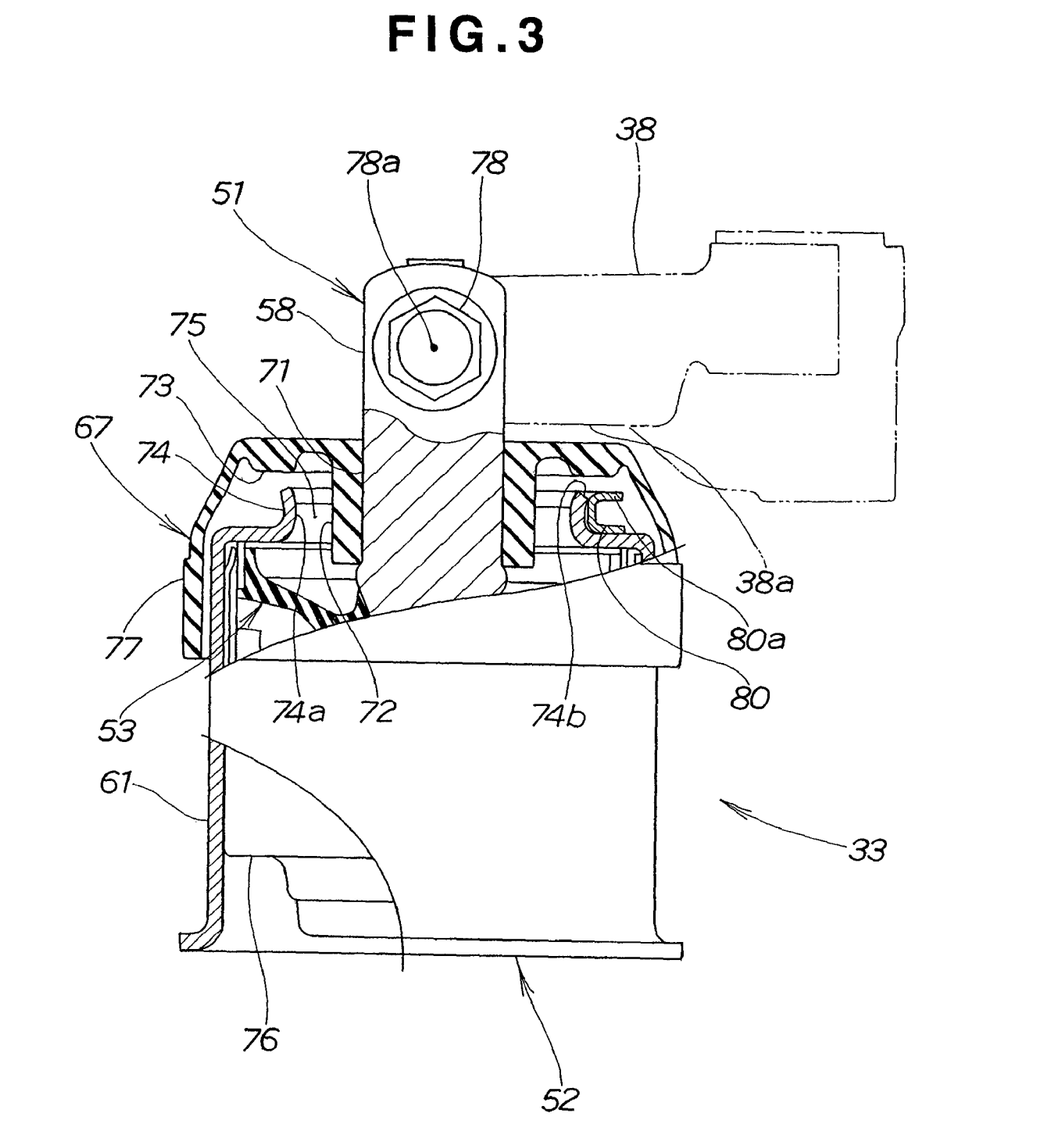
FIG. 3 is a front elevational view, with parts cut away for clarity, of the engine side mount.

As shown in FIG. 2, the engine side mount 33 generally comprises an engine side mounting member (first mounting member) 51 for attachment to the engine 10 (FIG. 1), a body side mounting member (second mounting member) 52 for attachment to the vehicle body (right plate) 27, and an elastic connecting member 53 (FIG. 3A) elastically connecting together the first mounting member 51 and the second mounting member 52. The elastic connecting member 53 is received in the body side mounting member 52.

The engine side mounting member 51 includes a cylindrical shaft portion 58. The shaft portion 58 has an upper part cut or removed at diametrically opposite sides so as to form two parallel flat surfaces 54 and 56 extending axially of the shaft portion 58. The upper part of the shaft portion 58 also has a radial through-hole 57 opening at opposite ends to the flat surfaces 54, 56. A screw 78 (FIG. 3) is inserted through the through-hole 57 so as to secure the shaft portion 58 to the mount bracket 38 (FIGS. 1 and 3).

The body side mounting member 52 includes a tubular body 61 having an annular flange 62 at a lower end thereof. The annular flange 62 has a generally oblong or elliptical shape including a circular central portion contiguous with a lower edge of the tubular body 61 and two lateral wings projecting outward from the circular central portion in diametrically opposite directions. The flange 62 has two attachment holes 64, 64 formed in the lateral wings such that the attachment holes 64, 64 are disposed in diametrically opposed relation with each other about a center of the body side mounting member 52 which is corresponding to the axis of the tubular body 61. The flange 62 also has a plurality (three in the illustrated embodiment) of projections 66 protruding in a downward direction. The projections 66 are offset from a straight line passing through centers of the attachment holes 64, 64. When the flange 62 is attached to the right plate 27 (FIG. 1) by means of two screws (not shown), the projections 66 are forced against the right plate 27 to thereby ensure that the body side mounting member 52 can be secured to the right plate 27 with improved stability comparable to the stability attained by a three-point or a four-point fixing structure.

The engine side mount 33 further includes a cover 67 made of elastic material such as rubber. The elastic cover 67 is fitted over the engine side mounting member 51 and an upper part of the body side mounting member 52 with the upper part of the shaft portion 58 projecting outward from the cover 67 so that any space or gap between the engine side mounting member 51 and the body side mounting member 52 is covered by the cover 67. With the cover 67 thus provided, the engine side mount 33 is made waterproof in construction.

As shown in FIG. 3, the elastic cover 67 has a generally cup-like shape and includes a central sleeve 72 fitted with a cylindrical body 71 of the shaft portion 58 of the engine side mounting member 51, and a downwardly protruding annular land 73 disposed concentrically around the sleeve 72. The sleeve 72 and the annular land 73 are made thicker than the rest of the cover 67. The tubular body 61 of the body side mounting member 52 has an upper end portion narrowed or reduced in diameter so as to form a tubular neck 74. The tubular neck 74 extends around the sleeve 72 of the cover 67 which is fitted around the cylindrical body 71 of the shaft portion 58 of the engine side mounting member 51. The tubular neck 74 has an inner cylindrical surface 74a facing an outer cylindrical surface of the sleeve 72. An open upper end 74b of the tubular neck 74 is normally disposed beneath at least an inner part of the annular land 73 of the elastic cover 67 for abutment with the annular land 73 when the cover 67 is displaced downward due to downward movement of the shaft portion 58. A semi-circular guide ring 80 is fitted around the tubular neck 74 and extends along a circumferential portion of the tubular neck 74 which is disposed below the mount bracket 38. The guide ring 80 has an upper surface 80a lying flush with the upper end 74b of the tubular neck 74 for controlling the elastic deformation of the annular land 73 in a desired manner when the land 73 is compressed by and between the mount bracket 38 and the upper end 74b of the tubular neck 74, as will be described later.

The cover 67 also has a tubular side wall 77 extending around an upper part of the tubular body 61 including the neck 74. Reference numeral 75 shown in FIG. 3 denotes an annular space defined between the shaft portion 58 of the engine side mounting member 51 and the tubular neck 74 of the body side mounting member 52, which is covered by the elastic waterproofing cover 67. The body 71 of the engine side mounting member 51 and the tubular body 61 of the body side mounting member 52 are elastically connected together by means of the elastic connecting member 53. In the illustrated embodiment, the connecting member 53 is made of rubber and held in an inner tube 76 received inside the tubular body 61 of the body side mounting member 52. Reference character 78a shown in FIG. 3 denotes an axis of the screw 78.

The sleeve 72 of the cover 67 serves as a radial stopper against displacement of the shaft portion 58 of the engine side mounting member 51 in a radial direction relative to the tubular body 61 of the body side mounting member 52. When the shaft portion 58 is displaced in a radial direction due to, for example, lateral movement of the engine 10 (FIG. 1) transmitted via the mount bracket 38 to the shaft portion 58, the sleeve 72 moves together with the shaft portion 58 and occasionally comes into striking contact with the inner cylindrical surface 74a of the tubular neck 74. In this instance, due to its elasticity, the sleeve 72 of the elastic cover 67 absorbs impact shock and eventually stops radial displacement of the shaft portion 58.

The annular land 73 of the cover 67 serves as an axial stopper against displacement of the shaft portion 58 of the engine side mounting member 51 in an axial direction toward the tubular body 61 of the body side mounting member 52. When the shaft portion 58 is displaced in an axial downward direction due to downward movement of the engine 10 (FIG. 1) transmitted via the mount bracket 38 to the shaft portion 58, the annular land 73 moves downward together with the shaft portion 58 and comes into abutment with the upper end 74b of the tubular neck 74. In this instance, due to its elasticity, the annular land 73 of the elastic cover 67 absorbs impact shock and elastically restricts downward displacement of the shaft portion 58. As the shaft portion 58 further moves downward, a lower surface 38a of the mount bracket 38 comes into contact with an upper surface of the end wall of the cup-shaped elastic cover 67 and, subsequently, the annular land 73 is deformed into an axially compressed, radially extended configuration by and between the mount bracket 38 and the upper end 74b of the tubular neck 74 of the body side mounting member 52. In this instance, the guide ring 80 with its upper surface 80a lying flush with the upper end 74b of the tubular neck 74 operates to control or guide the elastic deformation of the annular ring 73 in such a manner that a portion of the end wall of the elastic cover 67 including the annular ring 74 elastically deforms into a flattened configuration. Owing to the elasticity of the cover end wall portion including the annular land 73 being thus compressed, further downward movement of the shaft portion 58 is prevented from occurring.

Operation of the axial and radial displacement stoppers 73 and 72 of the cover 67 will be described below with reference to FIGS. 4A and 4B and FIGS. 5A and 5B, respectively.

Figure 4A:
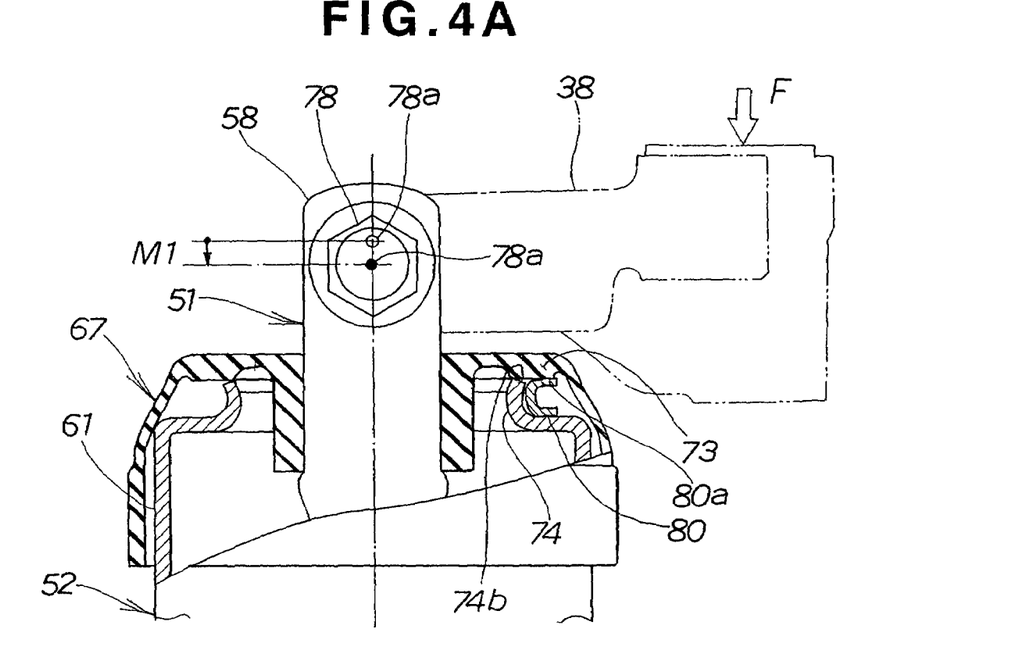
FIGS. 4A and 4B are views illustrative of the operation of an axial stopper of an elastic waterproofing cover when a shaft portion of a first mounting member is displaced in an axial direction toward a second mounting member.

When the mount bracket 38 is subjected to a downward force F (indicated by a profiled arrow shown in FIG. 4A) applied thereto from the engine 10 (FIG. 1), the shaft portion 58 of the engine side mounting member 51 is displaced downward. Downward movement of the shaft portion 58 causes the cover 67 to move downward together with the shaft portion 58. When the shaft portion 58 is downwardly displaced from the original position shown in FIG. 3 over a distance M1, the annular land 73 of the cover 67 comes in abutment with the upper end 74b of the tubular neck 74 of the body side mounting member 52, as shown in FIG. 4A. In this instance, the annular land 73 having a certain degree of elasticity can absorb impact shock and elastically restrict downward movement of the shaft portion 58.

Figure 4B:
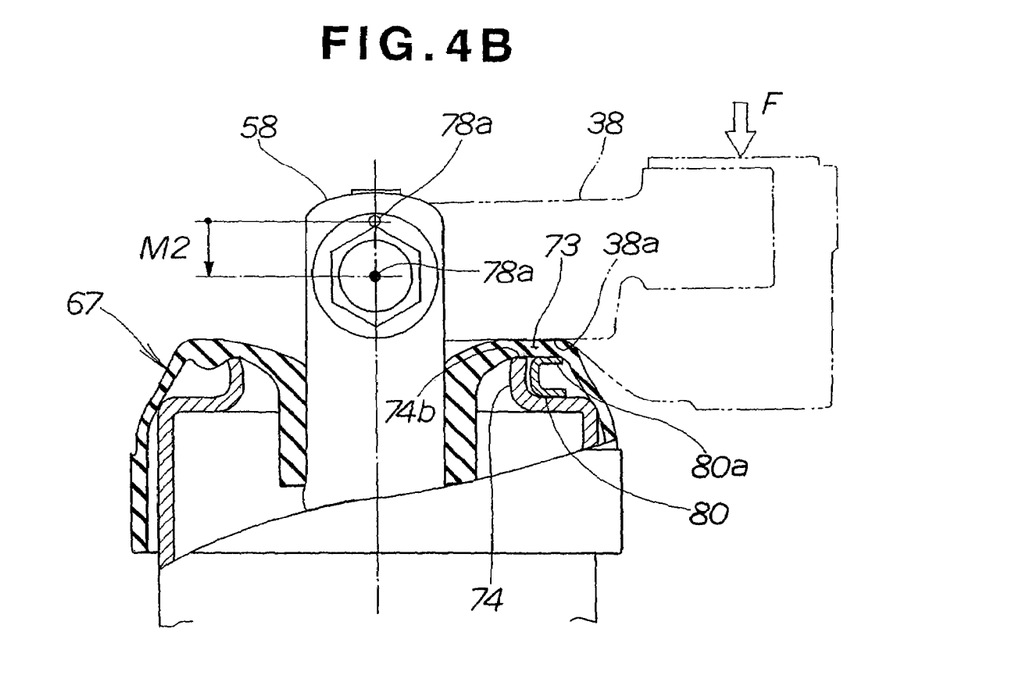

As the downward movement of the shaft portion 58 further continues, the lower surface 38a of the mount bracket 38 comes in contact with an upper surface of the end wall of the cup-shaped elastic cover 67 and, subsequently, a portion of the cover end wall including the annular land 73 is compressed by and between the mount bracket 38 and the upper end 74b of the tubular neck 74. In this instance, the annular land 73 is elastically deformed into an axially compressed and radially extended configuration and the guide ring 80 with its upper surface 80a lying flush with the upper end 74b of the tubular neck 74 operates to control the elastic deformation of the annular land 73 in such a manner that the portion of the cover end wall including the annular land 73 elastically deforms into a flattened configuration, as shown in FIG. 4B. In the position shown in FIG. 4B, the shaft portion 58 is downwardly displaced from its original position by a distance M2 and, by virtue of the elasticity of the cover end wall portion including the annular land 73 being thus compassed between the mount bracket 36 and the annular neck 74 and also between the mount bracket 38 and the guide ring 80, further downward movement of the shaft portion 58 does not occur.

Figure 5A:
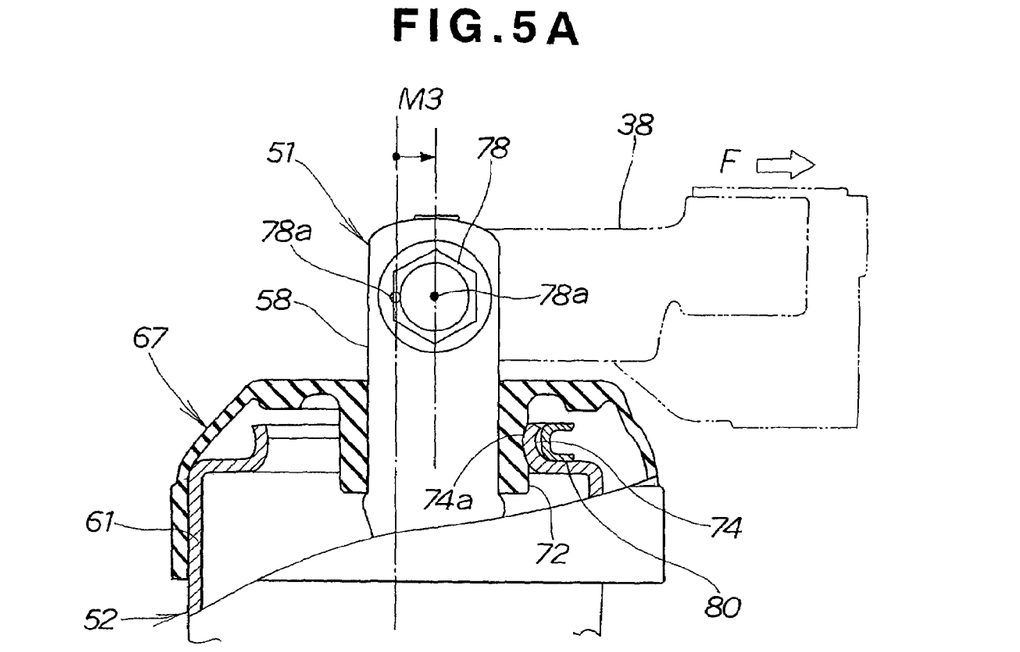
FIGS. 5A and 5B are views similar to FIGS. 4A and 4B, respectively, but showing the operation of a radial stopper of the cover when the shaft portion is displaced in a radial direction relative to the second mounting member.

FIG. 5A shows a condition in which, due to a force F applied from the engine 10 (FIG. 1) to the mount bracket 38, the shaft portion 58 of the engine side mounting member 52 is displaced in a radial direction (rightward in FIG. 5A) over a distance M3 from the original position shown in FIG. 3. In this condition, the sleeve 72 of the elastic cover 67, which has been displaced rightward together with the shaft portion 58, is in pressure contact with the inner cylindrical surface 74a of the tubular neck 74 of the body side mounting member 62. The sleeve 72, by virtue of its elasticity, can absorb impact shock and eventually stop radial movement of the shaft portion 58.

Figure 5B:
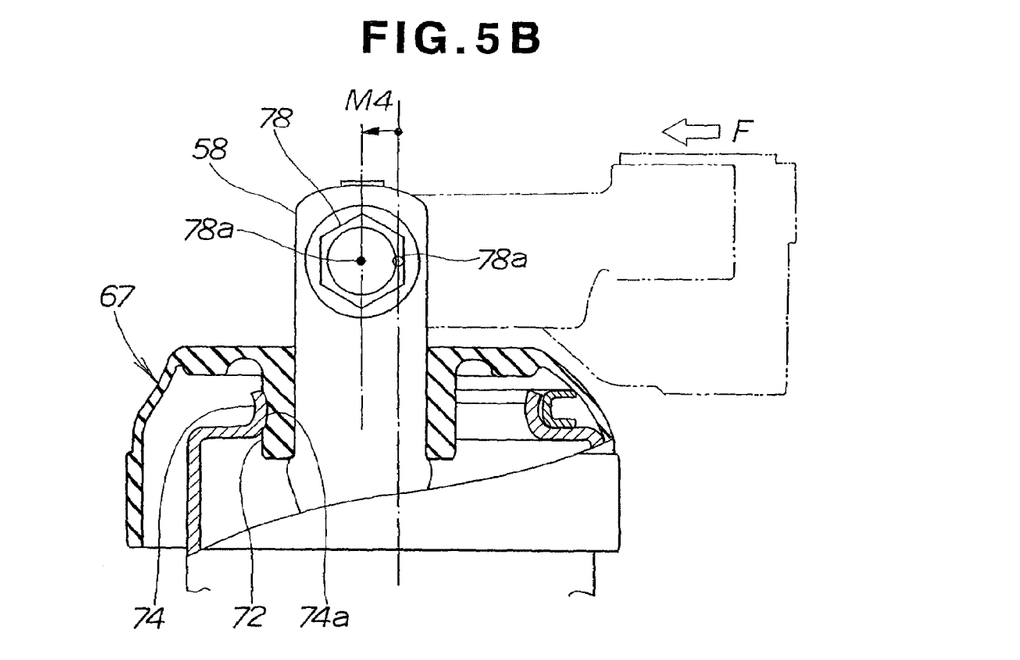

FIG. 5B is a view similar to FIG. 5A, but showing a condition in which the shaft portion 58 is displaced in a radial direction (leftward in FIG. 5B) over a distance M4 from the original position of FIG. 3 due to a force F applied from the engine 10 (FIG. 1) to the mount bracket 38. In this condition, the sleeve 72 of the elastic cover 67, which has been displaced leftward together with the shaft portion 58, is in pressure contact with the inner cylindrical surface 74a of the tubular neck 74. The sleeve 72, by virtue of its elasticity, can absorb impact shock and eventually stop radial movement of the shaft portion 58.

As thus far explained, the vehicular power unit mount structure according to the present invention includes an elastic waterproofing cover 67 that covers an annular space 75 defined between a shaft portion 58 of an engine side mounting member 51 and a tubular portion (tubular neck) 74 of a body side mounting member 52. The elastic cover 67 has an axial displacement stopper (annular land) 73 engageable with an end 74b of the tubular portion 74 to elastically absorb impact shock and eventually stop movement of the shaft portion 58 when the shaft portion 58 is displaced in an axial direction toward the body side mounting member 52. The elastic cover 67 also has a radial displacement stopper (sleeve) 72 engageable with an inner cylindrical surface 74a of the tubular portion 74 to elastically absorb impact shock and eventually stop movement of the shaft portion 58 when the shaft portion 58 is displaced in a radial direction relative to the body side mounting member 52.

The radial and axial displacement stoppers 72 and 73 formed as integral parts of the elastic cover 67 can be easily produced at a relatively low cost. Furthermore, use of the elastic cover 67 having such displacement stoppers 72, 73 allows the engine side mounting member 51 to have an extremely simple shape and configuration such as a shaft, as compared to the flanged cylindrical member 104 of the conventional vehicular power unit mount structure shown in FIG. 6. Additionally, performance characteristics of the displacement stoppers 72, 73, which depend largely on the elasticity of the displacement stoppers 72, 73, can be readily changed merely by changing the shape and material of the elastic cover 67.

Obviously, various minor changes and modifications are possible in the light of the above teaching. It is to be understood that within the scope of the appended claims the present invention may be practiced otherwise than as specifically described.

What is claimed is:

1. A power unit mount structure for a vehicle, comprising:
    a first mounting member for attachment to a power unit and having a shaft portion;
    a second mounting member for attachment to a vehicle body and having a tubular portion surrounding the shaft portion so as to define an annular space therebetween;
    an elastic connecting member elastically connecting the first and second mounting members to one another; and
    an elastic waterproofing cover that covers the annular space between the shaft portion and the tubular portion, the cover being made of elastic material and having an axial displacement stopper engageable with an end of the tubular portion of the second mounting member to elastically absorb impact shock and eventually stop movement of the shaft portion when the shaft portion is displaced in an axial direction toward the second mounting member, and a radial displacement stopper engageable with an inner cylindrical surface of the tubular portion of the second mounting member to elastically absorb impact shock and eventually stop movement of the shaft portion when the shaft portion is displaced in a radial direction perpendicular to the axial direction relative to the second mounting member.

2. The power unit mount structure according to claim 1, wherein the elastic waterproofing cover has a cylindrical sleeve fitted with the shaft portion of the first mounting member and an annular land concentric with the sleeve and projecting toward the end of the tubular portion of the second mounting member, the sleeve and the annular land forming the radial displacement stopper and the axial displacement stopper, respectively.

3. The power unit mount structure according to claim 2, wherein the second mounting member includes a guide ring fitted around the tubular portion and having a surface lying flush with the end of the tubular portion for controlling elastic deformation of the annular land such that a portion of the elastic cover including the annular land elastically deforms into a flattened shaped when the portion of the elastic cover is compressed by and between a portion of the power unit and the end of the tubular portion.

* * * * *